Oct. 13, 1970  R. A. EPPLER ET AL  3,533,888
GLASS ARTICLE AND METHOD OF PRODUCTION
Filed Dec. 18, 1964  2 Sheets-Sheet 1

INVENTORS
Richard A. Eppler
Harmon M. Garfinkel
BY
Milton M. Peterson
ATTORNEY

United States Patent Office 3,533,888
Patented Oct. 13, 1970

3,533,888
GLASS ARTICLE AND METHOD
OF PRODUCTION
Richard A. Eppler, Painted Post, and Harmon M. Garfinkel, Horseheads, N.Y., assignors to Corning Glass Works, Corning, N.Y., a corporation of New York
Filed Dec. 18, 1964, Ser. No. 419,308
Int. Cl. C03b 21/00; C03c 15/00
U.S. Cl. 161—1                                      4 Claims

ABSTRACT OF THE DISCLOSURE

This invention relates to glass articles characterized by increased mechanical strength and to a method of producing such articles. It is particularly concerned with an article formed from one glass and encased in a compressively stressed surface layer of a different glass, and with a method of producing such article by ion exchange.

---

Figure 1:
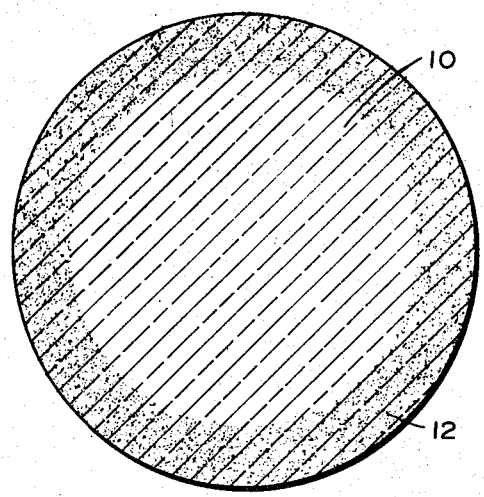

The mechanical strength of a glass article enables the article to resist fracture when exposed to either a bending load or an impact. It may be increased by introducing compressive stress into a surface layer on the article. Normally, such compressively stressed layer encompasses the entire article with the stress being introduced to a uniform depth and degree. However, it is also known to strengthen only a portion of an article such as the rim of a cup or tumbler.

Available techniques for introducing compressive stress include a thermal treatment known as tempering, a physical treatment known as casing with a lower expansion glass, and chemical treatments involving ion exchange. The present invention is particularly concerned with chemical strengthening which, in a generic sense, includes any technique of developing compressive stress in a surface layer of a glass article by exchanging or replacing an ion within such surface layer by a second ion from a material in contact with the glass surface.

U.S. Pat. No. 2,779,136, granted in the names of H. P. Hood and S. D. Stookey, teaches a method wherein the ion exchange is effected at a temperature intermediate to the strain and softening points of the glass. In accordance with the patent teaching, sodium or potassium ions from a glass article containing such ions are exchanged with lithium ions from a molten bath in contact with the glass. The ions are exchanged above the glass strain point so that the molecular arrangement in the glass readily rearranges to accommodate the smaller lithium ion. This releases stress developed by the exchange, but produces a glass layer of new composition and structure which has a lower thermal coefficient of expansion. As the article cools then, it is cased with a low expansion glass and compressive stress develops due to the expansion differential.

More recently, it has been found that strengthening compressive stresses may be developed in a glass article without rearrangement of the glass structure. In this case, an ion of relatively small ionic radius from the glass, e.g. a lithium ion, is exchanged with a larger ion from the contacting material, for example, a sodium ion. The exchange is at a sufficiently low temperature so that there is no substantial change in the glass structure and consequently no substantial stress release.

The latter, lower temperature technique finds particular favor because it enables one to impart relatively high abraded strength, e.g. 30,000 to over 100,000 p.s.i, to certain glasses without altering or impairing the normal glass transparency by crystal growth. It also minimizes dimensional distortion in the product, and normally provides a convenient and inexpensive production process.

In general, the rate of ion exchange depends in individual ionic mobilities. For this reason, it is desirable to employ lithium containing glasses in low temperature chemical tempering, and to strengthen such glasses by replacing the lithium ion with a sodium ion from a corresponding molten salt bath.

Available raw materials for lithium glass batches are, however, relatively expensive, thus resulting in a high batch cost for the parent glass. Also, the viscosity and devitrification characteristics of lithium silicate type glasses frequently make it difficult to employ conventional glass forming processes in handling these glasses. A further problem arises in service where it is found that a strength increase imparted to a glass by a large-for-small ion exchange may be rapidly lost if the article is exposed to elevated temperatures on the order of 400° C. and higher for an extended period of time.

We have now discovered that the lower temperature, i.e. large-for-small ion, type of chemical strengthening ion exchange can be effectively carried out on a glass article having a surface layer of a lithium silicate type glass produced by the higher temperature ion exchange described in the previously mentioned Hood-Stookey patent. In accordance with our findings then, it is possible to produce an article from a relatively inexpensive and easily worked sodium or potassium silicate glass, and to then develop on the article a surface layer of lithium glass which is particularly suitable for the lower temperature type of chemical strengthening treatment.

The degree of strength attainable in an article by this means is equivalent to that attainable in an article having the composition of the newly synthesized surface layer. It is of particular significance, however, that an article strengthened in accordance with our two step or double exchange retains its increased strength at considerably higher temperatures than does an article strengthened by a single, large-for-small ion exchange in conventional manner.

Based on these and other discoveries, the product embodiment of our invention is a glass article characterized by increased mechanical strength; the article is formed from an alkali metal silicate glass wherein the alkali metal ion has an ionic radius larger than that of lithium; the central portion of the article has a glass structure characteristic of the larger ion, the article is encased in a surface layer of a glass of different molecular structure, the composition of which has a higher lithium content, but equal total alkali metal ion content on a mole basis, as compared to the parent article glass; the glass of the surface layer having a portion of the positions normally occupied by lithium ions occupied by alkali metal ions having a larger ionic radius than lithium, whereby the surface layer is compressively stressed.

Such article may take the form of a flat plate or sheet of glass as used in structural and vehicular closures. Alternatively, it may be an article of molded hollow ware such as a container or vessel for use in packaging, preparation or serving of foods or beverages. The high temperature, strength retention characteristics of our inventive product have particular significance in the field of cooking ware and similar articles which are necessarily subjected to elevated temperatures for extended periods of time in use. For test and developmental purposes, however, short lengths of quarter inch diameter glass cane or rod have been found to be particularly useful in determining strength and other characteristics attainable with different glass compositions and conditions of treatment.

Regardless of physical form, the article is initially formed from an alkali metal silicate glass wherein the alkali metal ion is other than lithium and a central or core portion of the article remains essentially unchanged.

Preferably the primary alkali metal ion is one commonly employed in oxide form for flux purposes in glass melting, i.e. sodium, potassium and mixtures of these two. While other alkali metals such as rubidium and cesium may be used, they are of less interest because of their greater cost and their lesser mobility during ion exchange.

The terminology, "alkali metal silicate," is used in its conventional sense to indicate a glass composition wherein silica ($SiO_2$) is the sole or primary glass forming oxide, one or more alkali metal oxides constitute the principal glass modifier, and there is normally at least one additional glass modifying oxide such as an alkaline earth metal oxide, alumina, boric oxide, etc.

The degree of strengthening attainable is considerably enhanced by the presence of a substantial amount of alumina or zirconia in the glass. Accordingly, we find that glasses particularly suited to our purposes may consist essentially of 5–25% $Na_2O$ and/or $K_2O$, 5–25% $Al_2O_3$ and/or $ZrO_2$, 45–80% $SiO_2$, and 0–20% of other conventional glassmaking materials. Among the optional glass ingredients, we find that up to about 1% $Li_2O$ is particularly effective in minimizing a crystallization effect which frequently tends to develop during subsequent treatment of the glass. Amounts up to about 5% may be employed, but are normally unnecessary for this purpose. Alkaline earth oxides are commonly employed to improve meltability and/or chemical durability of the glass, but in amounts greater than about 5% tend to seriously depress or diminish the degree of strengthening attainable in a given glass. Titania may also be used for flux purposes but is limited by the tendency to produce a crystalline phase in accordance with the teaching in the Hood-Stookey patent.

In accordance with the method aspect of our invention, the strengthened silicate glass article just described is produced by initially forming an article from an alkali metal silicate glass wherein the alkali metal ion is primarily other than lithium, thereafter forming on the article a surface layer of a silicate glass having a different composition and structure than the parent glass of the article, such surface glass being characterized by a substantially enhanced content of a smaller alkali metal ion, preferably lithium, with respect to that of the parent glass, and then exchanging the smaller ions from the surface glass layer with exchangeable ions of larger ionic radii without appreciable rearrangement of the glass structure, thereby producing a compressively stressed surface on the article. Preferably, the parent glass of the article contains at least one oxide selected from the group consisting of $Na_2O$ and $K_2O$, and a lithium silicate glass surface layer is produced by contacting the article at a temperature above the glass strain point with a material containing lithium ions whereby such lithium ions are exchanged for the larger alkali metal ions of the parent glass, in part at least, to form the surface layer of different composition and structure.

The lithium, or other smaller ion, exchange for a larger alkali metal ion above the glass strain point produces a thin layer of glass which differs both structurally and compositionwise from the parent alkali metal silicate glass from which the article was formed. The new glass is designated as a lithium silicate glass inasmuch as it corresponds to the parent glass except that there is a substantially increased lithium content and a substantially decreased sodium ion content in the new glass, but the total alkali metal oxide content on a molar basis is the same in both glasses. Inasmuch as the exchange is above the glass strain point, the parent glass structure rearranges to accommodate the changes in size of the constituent alkali metal ions, that is, the change from sodium to lithium ions in the glass composition.

The ensuing description is directed to a preferred embodiment of the invention wherein the primary alkali metal ion in the parent glass is sodium and the encasing layer is a corresponding lithium silicate glass. While other alkali metal ion combinations might be employed, the sodium-lithium pair provides the most advantageous mutual diffusivity characteristics for ion exchange.

The description is made with reference to the accompanying drawing wherein,

FIG. 1 is a schematic representation in cross-section of a cylindrical glass rod in accordance with the invention.

Figure 4:
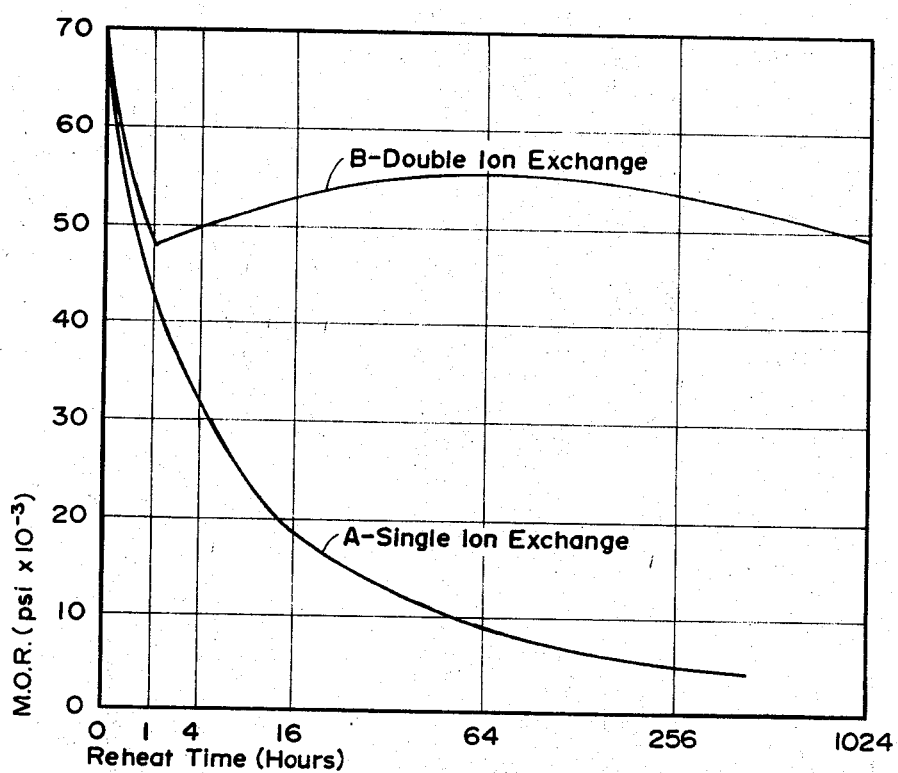
Figure 2:
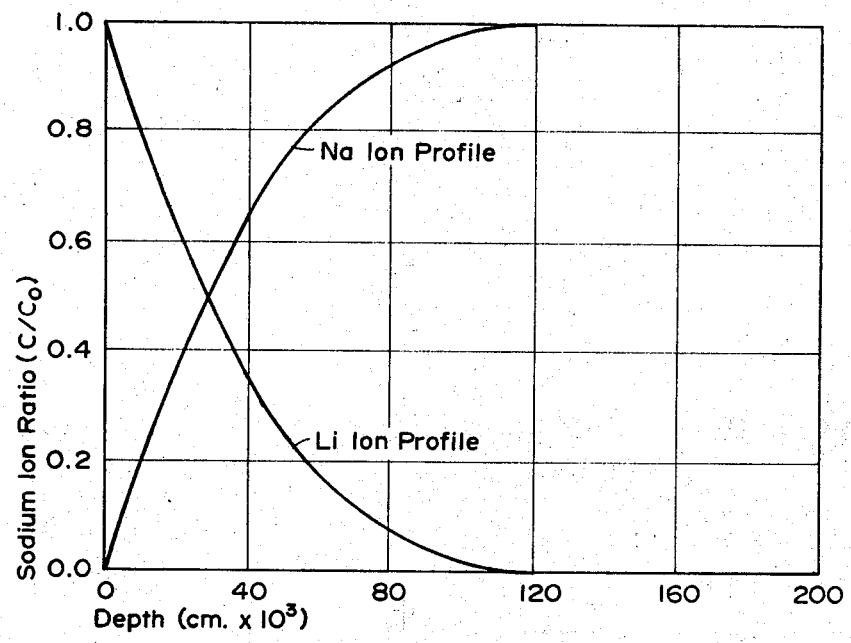
Figure 3:
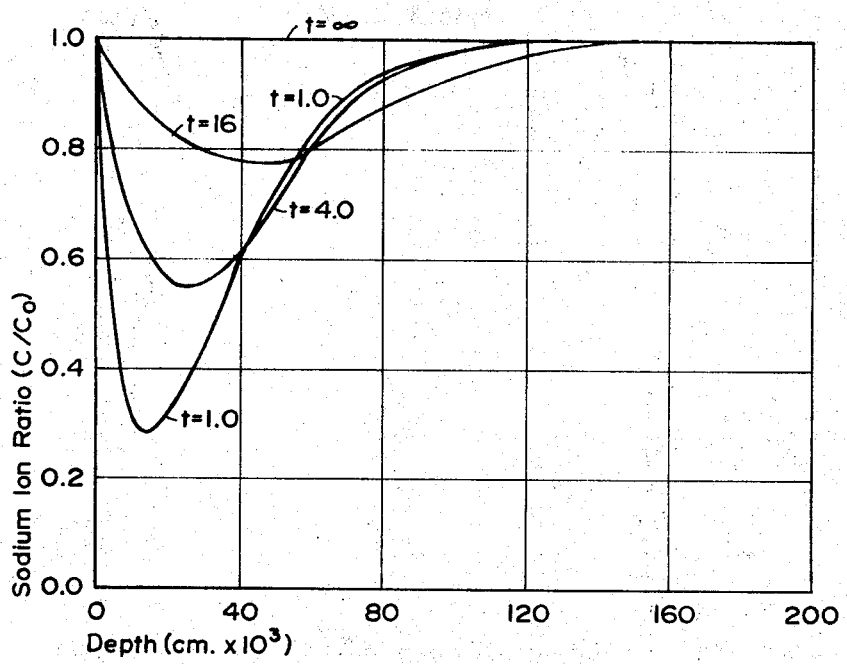

FIGS. 2 and 3 graphically illustrate the manner in which sodium ion concentration may be varied in an article in accordance with the invention, and FIG. 4 graphically illustrates strength retention characteristics of an article of the invention.

In the glass rod of FIG. 1, core portion 10 is encased in an encircling layer 12 of a glass having a lithium silicate glass structure, i.e. a structure differing from that of core glass 10 in that the number of lithium ion sites or positions in the glass structure are substantially greater than in the core glass, but with the total number of alkali metal ion sites or positions (the molar content of alkali metal oxide) being the same. The glass of layer 12 is further characterized in that at least a portion of the lithium ion sites or positions in the lithium silicate glass structure of surface layer 12 is occupied by larger ions, such as sodium or potassium ions, without change in the lithium silicate glass structure. The presence of such larger ions in the smaller lithium ionic sites creates a compressively stressed condition in the surface layer 12 which remains as long as the glass structure is not permitted to rearrange to accommodate the larger ions. Surface layer 12 is normally quite thin, but preferably at least 2–4 mils in depth or thickness in order to resist ultimate loss of strength in the product due to abrasion.

It should be understood that composition varies in a gradient manner in surface layer glass 12. Nevertheless, for purposes of identification and differentiation from the interior glass, the surface layer 12 is treated as a single entity.

The manner in which the surface layer composition may vary is illustrated in FIG. 2 which shows the sodium ion profile in a typical sodium aluminosilicate glass article subjected to a lithium ion exchange for 15 minutes under conditions such that the mutual ion diffusion rate is $10^{-6}$ cm.$^2$/sec. In the figure, the sodium ion ratio, $$\frac{C}{C_0}$$

is plotted along the vertical axis, while depth below the article surface (as indicated by the arrow in FIG. 1) is plotted in thousandths of a centimeter along the horizontal axis. Sodium ion ratio is the ratio of sodium ion content at any given point to the sodium ion content of the parent glass prior to any exchange. It will be apparent that the lithium ion profile may be obtained by rotating the sodium ion profile 180° on the $$\frac{C}{C_0} = 0.5$$

axis, and this is shown by the dotted line curve.

A particular advantage of our invention is the ability to use sodium or potassium oxide, or a mixture of these oxides, as the primary flux for silica in the glass from which the glass article of the invention is initially formed. In practicing the invention then, a silicate glass batch, including such flux oxides, is mixed and melted to produce a glass melt from which an article of the desired shape is formed, all in accordance with conventional glass practice.

The glass article thus provided is immersed in a suitable molten lithium salt bath at a temperature above the glass strain point and for a sufficient time to effect a desired depth of ion exchange between the glass and the bath in accordance with teaching in the Hood-Stookey patent. The essential requirement of the salt bath is that it provide an exchangeable lithium ion which is introduced into the glass for ultimate replacement by a larger ion in a subsequent ion exchange step. Consequently, the molten salt bath will normally be composed of an ionizable lithium salt either alone or in conjunction with another salt.

A mixed salt bath may be necessary to provide a temperature adequately above the glass strain point. For example, mixtures of 50–95% lithium sulfate ($Li_2SO_4$) and 50–5% sodium sulfate ($Na_2SO_4$) have been used to provide temperatures of 600–860° C. Chloride baths have also been used, but are less desirable because of chemical attack on metal containers and equipment, as well as the glass itself.

As used herein, "strain point" or "strain temperature" are used in accordance with ASTM usage to indicate a temperature at which the glass has a defined condition or state with respect to stress release. In general, it indicates a maximum temperature at which stress release does not occur under defined conditions and is equivalent approximately to a viscosity of about $10^{14.5}$ poises.

The time required for the initial lithium ion exchange will vary with the temperature of exchange. Thus, the optimum exchange time may vary from as little as five minutes at a temperature approximating the softening or deformation point of the glass up to 100 hours at a temperature just above the strain point. Customarily, temperatures of about 50–100° C. below the glass softening point are employed in conjunction with times on the order of a few minutes to an hour. In the event an ion other than lithium is involved, the lesser mobility will necessitate a correspondingly longer exchange time. In any event, the necessary condition to achieve is a synthesized layer of a silicate glass for subsequent large-for-small ion exchange as hereafter described.

The glass article, thus provided with a synthetic layer of lithium silicate glass, is now contacted with an ion exchange material providing a larger ion than lithium. This may be the same ion as originally melted in the glass and removed by the initial exchange. Preferably the mode of surface contact is by means of a molten salt bath. Thus, for the article having a synthetic lithium silicate glass layer on its surface, the bath might be a salt of sodium, potassium, silver, or a mixture of such a salt with a modifying salt to provide a proper bath temperature. Typically, a sodium nitrate bath may be used to introduce sodium ions.

The critical factor in this step of the method is to effect the exchange of a larger ion for the smaller lithium ion of the glass at a sufficiently low temperature so that no substantial molecular rearrangement can occur within the glass to accommodate the larger ion. Customarily then, the glass article is treated at a temperature below, but near, the glass strain point to shorten the exchange time.

In this case as well, the time required for optimum strengthening will vary considerably depending upon the ions involved, the glass composition, and the exchange temperature. In a given glass, an optimum exchange of sodium for lithium ions for strengthening purposes may require about 1 hour at temperatures of 50–100° C. below the glass strain point. As a rule of thumb, this time will approximately double for each drop of 50° C. in temperature to about 250° C. Where larger ions such as potassium or rubidium are employed, a considerably longer exchange time is required as would be expected from ion mobility.

FIG. 3 illustrates the manner in which the sodium ion concentration profile of FIG. 2 is altered by this second ion exchange. In FIG. 3, the sodium ion ratio $$\left(\frac{C}{C_0}\right)$$

that is, the ratio of existing sodium ion content to that of the original parent glass, is again plotted along the vertical axis and depth within the glass (in thousandths of a centimeter) along the horizontal axis. Each of the various curves shows the sodium ion profile at the time "$t$" in hours that identifies the curve in terms of the time of the second ion exchange. The profile curve of FIG. 2 shows the ion distribution at zero time ($t=0$). This profile gradually changes with time and approaches the condition of infinite time, where the lithium ions are completely replaced, as shown by the straight line in FIG. 3.

As used in this application, the term "strength" refers to the tensile strength of a material or article determined as modulus of rupture (MOR). This is the transverse strength of a test piece, usually a rod or bar of known cross section, and is ascertained in a conventional manner. Initially, a breaking load is ascertained by supporting the test pieces across two definitely spaced knife edges, mounting a second pair of knife edges on the test piece in uniformly spaced relation between the first two knife edges, and loading the second pair until breakage occurs. The maximum tensile stress, in pounds per square inch, produced at the lower surface of the test piece is then computed from the load, the size and shape of the sample, and the test geometry. This is here reported as MOR in p.s.i.

The term "abraded strength" refers to the tensile strength, ascertained as described above, of a body having a multiplicity of abrasions, that is visible scratches or defects, deliberately produced on its surface. The nature and degree of abrasions produced on a glass surface in service will vary with the service conditions. Accordingly, standard abrasion tests have been devised to provide a valid basis for comparison as well as to simulate known types of service conditions.

For present purposes, two types of abrasion have been employed. In one type, a test piece, e.g. a 4 inch by about ¼ inch diameter glass cane, is mechanically mounted and rapidly rotated for about 30 seconds in contact with 150 grit silicon carbide paper under a small constant pressure to maintain uniform contact. A second type is referred to as tumble abrasion. In this case, ten similar size glass rods are mixed with 200 cc. of 30 grit silicon carbide particles, and subjected to a tumbling motion for 15 minutes in a Number 0 ball mill jar rotating at 90 to 100 r.p.m. The first type of abrasion simulates surface flaws that occur in service as a result of rubbing against hard materials, for example glass articles rubbing against each other. Flaws produced in the latter type simulate those resulting from a combination of such rubbing abrasion and actual impact.

The strength of glass with an undamaged fresh surface is very high, as shown by measured strengths of several hundred thousand p.s.i. on freshly drawn glass fibers and rods. In actual practice, however, the strength of ordinary commercial glassware varies from 5,000 to 25,000 p.s.i. depending on the type of glass, the method of production, and the nature of subsequent handling.

The following compositions, formulated in parts by weight on an oxide basis, illustrate glasses which are particularly useful in conjunction with the present method.

|  | 1 | 2 | 3 | 4 | 5 | 6 | 7 | 8 | 9 |
|---|---|---|---|---|---|---|---|---|---|
| $SiO_2$ | 62.1 | 64.4 | 65.4 | 64.5 | 59.2 | 62.8 | 55.2 | 64.7 | 72.0 |
| $Al_2O_3$ | 24.1 | 26.0 | 23.6 | 15.0 | 24.0 | 24.8 | 19.4 | | |
| $Na_2O$ | 7.2 | 6.4 | 9.0 | 20.0 | 9.5 | 9.9 | 16.3 | 19.9 | 11.0 |
| $Li_2O$ | 3.6 | 1.9 | 1.5 | | 1.8 | 1.0 | | | 1.0 |
| $TiO_2$ | | 0.8 | | | | | 5.0 | 1.0 | 4.6 |
| $As_2O_3$ | | 0.5 | 0.5 | 0.5 | 0.5 | 0.5 | 0.5 | 0.5 | |
| $CaO$ | | | | | | | 2.0 | | |
| $B_2O_3$ | | | | | | | | 2.0 | |
| $ZrO_2$ | | | | | | | | 14.9 | 16.0 |
| $K_2O$ | 0.1 | | | | | | | | |
| $MgO$ | 1.9 | | | | | | | | |
| $Sb_2O_3$ | 1.1 | | | | | | | | |

In general, these glasses may be melted in accordance with conventional practice from batches composed of conventional raw materials. Thus, a six pound batch may be melted in a crucible heated for 16 hours at about 1550–1600° C. in an electric furnace, and then drawn into cane as described earlier.

The invention will be further described with respect to specific examples in which the glass used in each example has a number in the table above corresponding to the number of the example, thus a glass of composition 1 being used in Example 1 below. In each example, unless otherwise indicated, the glass test samples are quarter inch glass rods of 4 inch length cut from long glass rods or canes drawn from a melt of the indicated glass, such shaped samples being particularly adapted for strength measurements. It will also be understood that in each instance corresponding untreated samples which have been annealed and then subjected to 150 grit abrasion will show MOR values of about 5,000–7,000 pounds per square inch. All compositions are given in percent by weight unless otherwise indicated.

EXAMPLE 1

A glass, corresponding to composition 1 in the table and designed for production of ware to be strengthened by sodium ion exchange, was melted and drawn into quarter inch cane from which a set of strength test samples was cut. The set of samples was preheated to 750° C. in air, and then immersed for two (2) minutes in a molten salt bath composed of 80% lithium sulfate and 20% lithium chloride and maintained at a temperature of 750° C.

This temperature is about 170° C. above the glass strain point. Consequently, a thin layer of silicate glass having an enhanced lithium content (greater than 3.6) was synthesized by exchange of lithium ions from the bath with sodium ions from the surface glass on the cane samples. Such higher lithium content glass would be extremely difficult if not impossible, to melt and form by conventional practice because of its unfavorable viscosity characteristics.

After cooling and cleaning, the "cased" glass canes thus produced were immersed for two hours in a sodium salt bath composed of 85% sodium nitrate and 15% sodium sulfate and maintained at a temperature of 450° C., about 120° C. below the nominal strain point of the glass.

After again cooling and cleaning, the cane samples were tumble abraded as described earlier. Each abraded cane was then mounted in the commercial strength testing machine referred to above and a gradually increasing load applied to the knife edge mounted cane. From the measured breaking load, an individual MOR value was calculated. The average value was 67,000 p.s.i.

By way of comparison, a corresponding set of cane samples was given identical treatment except that the initial ion exchange treatment in the lithium salt bath was omitted. Thus, the sodium ion exchange was effected with only the lithium ions originally present in the glass, that is in the surface layer in which exchange occurred. When these canes were abraded and their strength measured an average MOR of 50,000 p.s.i. was obtained.

This illustrates the capability of the invention to increase the strength attainable in an ion exchange glass containing a secondary flux for glass melting and handling purposes.

EXAMPLE 2

A set of five glass test rods produced from a melt of composition 2 was immersed for ten minutes in a molten salt bath composed of 95 parts by weight $Li_2SO_4$ and 5 parts $Na_2SO_4$, the bath being at a temperature of 800° C. The samples were then removed from the bath, cooled in air, washed and dried. They were then placed in a molten sodium nitrate bath for five hours, this bath being at a temperature of 400° C.

After cooling and cleaning, the samples were subjected to a tumble abrasion as described above and then mounted in a commercial strength testing device for measurement of the load required to break each sample in flexure. From these measured values, an average MOR value of 55,000 pounds per square inch was calculated.

EXAMPLE 3

A similar set of glass samples, produced from a melt of composition 3, was immersed for one hour in a molten salt bath composed of equal parts by weight of $Li_2SO_4$ and $Na_2SO_4$, the bath being at a temperature of 650° C. After this treatment, the samples were cooled, cleaned and then immersed in a molten sodium nitrate bath for 6 hours at 400° C. After cleaning and testing as in Example 1, an average calculated MOR of 66,700 p.s.i. was determined.

EXAMPLE 4

A set of glass test cane produced from a melt of composition 4 was immersed in a molten bath for 60 parts by weight $Li_2SO_4$ and 40 parts $Na_2SO_4$ at a temperature of 650° C. for a period of 15 minutes. The samples were then cooled and cleaned and immersed in a sodium nitrate bath at 400° C. for 4 hours. At the end of this time, it was found that the samples, after cooling and cleaning, had an average MOR value of 37,300 p.s.i.

EXAMPLE 5

A set of glass test rods, produced from a melt of composition 5 was immersed for 15 minutes in a bath composed of 80 parts $Li_2SO_4$ and 20 parts by weight $Na_2SO_4$ and operating at a temperature of 800° C. The set was then cooled, cleaned and immersed in a sodium nitrate bath for 4 hours at a temperature of 400° C. After cooling and cleaning the samples, it was found that they had an average MOR value of 58,300 p.s.i.

EXAMPLE 6

A set of glass test rods treated in accordance with the schedules of Example 5 were found to have an average MOR of 54,500 p.s.i.

EXAMPLE 7

A set of glass test rods produced from a melt of composition 7 was immersed in a molten salt bath composed of 60 parts by weight $Li_2SO_4$ and 40 parts by weight $Na_2SO_4$ for a period of 15 minutes at a temperature of 650° C. Following cooling and cleaning, the set was immersed in a sodium nitrate bath for 4 hours at 400° C., and then removed and cleaned. The calculated average MOR for this set of 5 samples was 42,000 p.s.i.

EXAMPLE 8

A set of 5 glass test rods produced from a melt of composition 8 was treated in accordance with the schedules set forth in Example 7. The calculated average MOR for this set of samples was 52,600 p.s.i.

EXAMPLE 9

A set of five glass test rods produced from a melt of composition 9 was immersed in a molten salt bath composed of 80 parts by weight $Li_2SO_4$ and 20 parts $Na_2SO_4$ for a period of 15 minutes at 720° C. After cooling and cleaning, the set was then immersed for four hours in a fused sodium nitrate bath operating at a temperature of 400° C. The calculated average MOR for this set of samples, after the indicated treatment was 45,700 p.s.i.

For purposes of comparison, a similar set of five glass test rods was given the indicated lithium sulfate bath treatment and then tested. The calculated average MOR for this set of samples was 14,000 p.s.i.

To complete the comparison, a third set of glass test samples was given only the four hour treatment in the sodium nitrate bath. The calculated average MOR for this set was 15,000 p.s.i.

It is well recognized that, when a glass article is heated above the glass strain point to a temperature in the transformation or annealing range, the glass structure quickly rearranges with consequent release of any existing stress. However, it has been found that the compressive stress strengthening induced in glasses by a large-for-small ion exchange treatment may be rapidly dissipated by extended heating at considerably lower temperatures. It is our belief that this is also due to release of compressive stress, but by ion or diffusion flow within the glass rather than viscous flow of the glass.

In contrast, a particular feature or characteristic of an article strengthened in accordance with the present invention is its high-temperature strength retention. This refers to the capability of retaining increased strength under subsequent heat treatment at relatively high temperatures below the annealing range. The nature of this highly advantageous feature is illustrated in the following comparative example:

EXAMPLE 10

Glass cane samples of the type described in the preceding examples were produced from a glass having the following approximate formulation in weight percent on an oxide basis: 50% $SiO_2$, 23% $Al_2O_3$, 7% $P_2O_5$, 18% $Na_2O$, 1% $Li_2O$ and 1% $K_2O$. For reference, the glass has a strain point of about 580° C.

One set of cane samples, hereafter designated as set A, was given a single step, large-for-small ion exchange strengthening treatment in accordance with known practice. This consisted of immersing the set of cane samples in a molten bath of potassium nitrate ($KNO_3$) for 16 hours with the bath at a temperature of 450° C. This treatment effected an exchange of potassium ions from the bath for sodium and lithium ions from the glass.

A second set of cane samples, hereafter designated as set B, was given a double ion exchange treatment in accordance with the present invention. This treatment consisted in immersing the set of samples for 10 minutes in a bath composed of 75% $Li_2SO_4$ and 25% $Na_2SO_4$ with the bath at a temperature of 750° C. This resulted in the introduction of lithium ions into the glass in exchange for sodium and potassium ions from the glass. The cane samples were then cleaned and transferred to a molten bath consisting of 85% $NaNO_3$ and 15% $Na_2SO_4$ for 2 hours with the bath at a temperature of 450° C. This second bath treatment served to introduce sodium ions into the glass in exchange for a portion of the lithium ions introduced by the previous ion exchange.

The two large sets of samples were then subdivided into smaller sets, and all samples were then reheated in air at 500° C. with a small set of each type of sample being removed periodically for strength measurement. Strength was measured on each individual cane after tumble abrasion as described earlier.

Average MOR values for set A and set B were calculated for the various reheating times, and these values are plotted in FIG. 4 of the accompanying drawing. This figure is a graphical representation wherein reheating time is plotted along the horizontal axis and average MOR (in thousands of p.s.i.) is plotted along the vertical axis. The two curves depicting the data obtained as described above are designated as A and B to correspond with the designations of the samples, and ion exchange treatments thereon, which are being compared.

It will be observed that, while the single ion exchange treatment plotted as curve A has the higher initial strength, this strength drops rapidly with reheating and appears to be totally lost at about 250 hours. In contrast, the samples strengthened in accordance with the present invention, plotted as curve B, undergo a small initial drop, then recover slightly and remain relatively constant even after a thousand hours of reheating. As is evident from the graphical illustration, loss of strength ultimately occurs. However, glass articles strengthened by the double exchange treatment can be considered as retaining a substantial portion of their increased strength for any reasonable service life at 500° C.

It will be understood that the foregoing specific description is intended to illustrate preferred embodiments, rather than limit the invention. Also, comparisons made here are illustrative of results obtaining generally within the scope of the invention as hereafter defined in the appended claims.

We claim:

1. A method of strengthening an alkali metal containing glass which comprises replacing the alkali metal ions in a surface of the glass by smaller alkali metal ions by contacting the glass with a source of said smaller alkali metal ions while retaining the glass at a temperature above the strain point of the glass, reducing the temperature of the glass below the strain point after said replacement, and thereafter replacing said smaller alkali metal ions with larger electropositive metal ions selected from the group consisting of the ions of alkali metals and silver by contacting the glass with a source of said larger electropositive metal ions while retaining the temperature of the glass below the strain point of the glass until the surface is placed in compression by said latter replacement.

2. The method of claim 1 wherein the selected larger and smaller electropositive metal ions are alkali metal ions.

3. The method of claim 1 wherein the glass is a lime-soda-silica glass and the smaller electropositive metal ions are lithium ions.

4. A strengthened glass article produced according to the process set forth in claim 1.

References Cited

UNITED STATES PATENTS

| | | | |
|---|---|---|---|
| 2,779,136 | 1/1957 | Hood et al. | 65—30 XR |
| 2,825,634 | 3/1958 | Rindone | 65—30 XR |
| 3,218,220 | 11/1965 | Weber | 65—30 XR |
| 3,287,200 | 11/1966 | Hess et al. | 65—30 XR |
| 3,287,201 | 11/1966 | Chisholm et al. | 65—30 XR |
| 3,293,016 | 12/1966 | Cornelissen | 65—30 |
| 3,395,998 | 8/1968 | Olcott | 65—30 |
| 3,420,698 | 1/1969 | Smith | 65—30 XR |
| 3,410,673 | 11/1968 | Markush | 65—30 |
| 3,396,075 | 8/1968 | Morris | 65—30 |

FRANK W. MIGA, Primary Examiner

U.S. Cl. X.R.

65—30, 32, 33, 111